Sept. 8, 1970    J. Y. CHATEAUNEUF    3,527,271
FELLING SKIDDER COMBINATION INCLUDING HEELING DEVICE
Filed Jan. 3, 1968    8 Sheets-Sheet 4

INVENTOR
JEAN Y. CHATEAUNEUF
BY
Jacobi & Davidson
ATTORNEYS

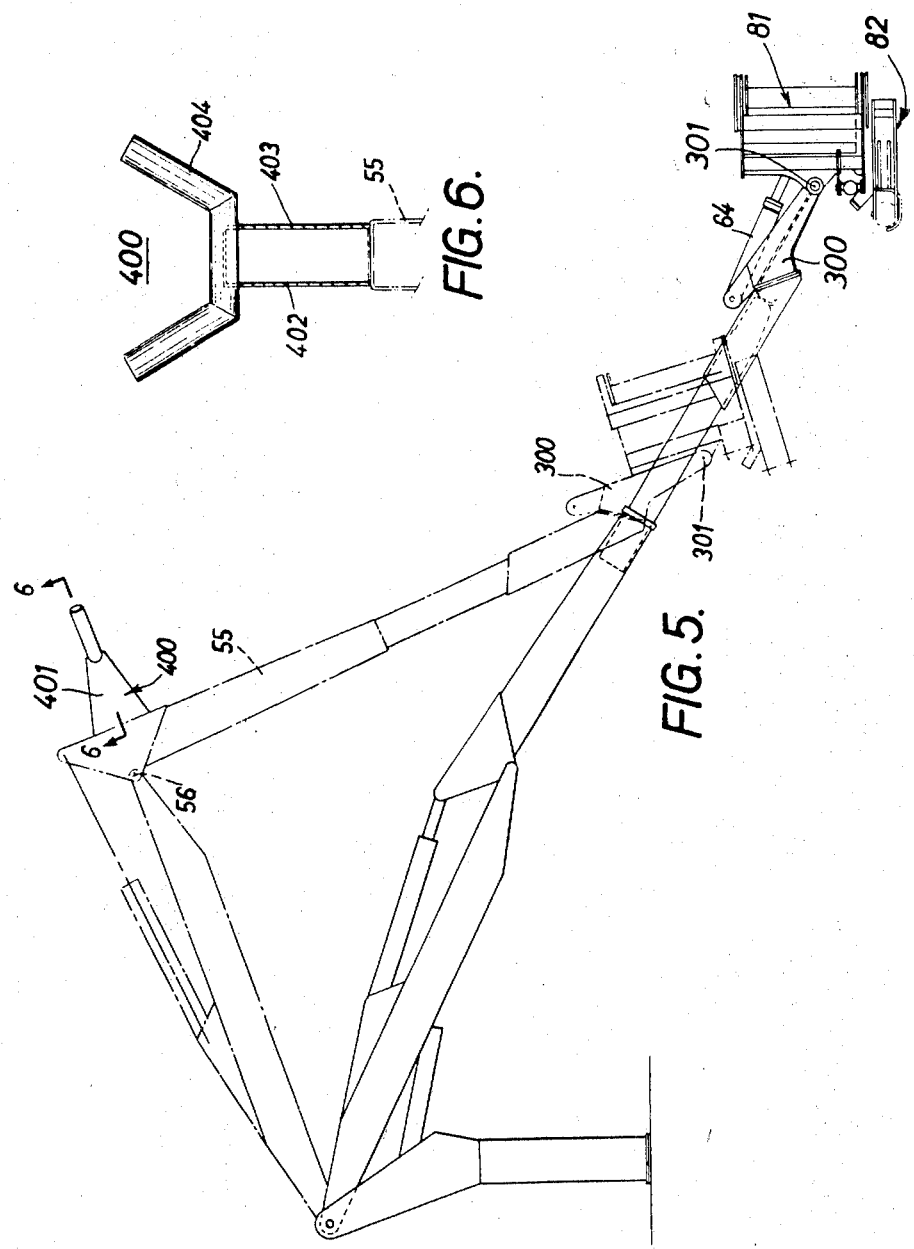

Sept. 8, 1970     J. Y. CHATEAUNEUF     3,527,271
FELLING SKIDDER COMBINATION INCLUDING HEELING DEVICE Filed Jan. 3, 1968     8 Sheets-Sheet 6

INVENTOR
JEAN Y. CHATEAUNEUF
BY
Jacobi & Davidson
ATTORNEYS

United States Patent Office 3,527,271
Patented Sept. 8, 1970

3,527,271
FELLING SKIDDER COMBINATION INCLUDING HEELING DEVICE
Jean Y. Chateauneuf, Montreal, Quebec, Canada, assignor of one-third each to Canadian International Paper Company and Quebec North Shore Paper Company, both of Montreal, Quebec, Canada, and Anne Paper Ltd., Beaupre, Quebec, Canada, all corporations of Canada
Filed Jan. 3, 1968, Ser. No. 695,402
Claims priority, application Canada, Jan. 6, 1967, 979,734
Int. Cl. A01g 23/02
U.S. Cl. 144—3                                                   19 Claims

ABSTRACT OF THE DISCLOSURE

A machine for use in field logging operations and which includes a self-propelled tractor unit having an extendible and retractable boom pivotally mounted thereon for selected movement about a vertical axis. A felling head consisting of a grapple and a shear mechanism is mounted on the boom and selectively operable, respectively, to engage a standing tree and sever such engaged tree. A heeling device is secured to the boom in spaced relation with respect to the felling head for engaging the tree during slewing of the boom to manoeuver the severed tree into a position suitable for loading the same onto a bunk on the vehicle. The bunk includes means for anchoring individually the butt end of several trees or groups of trees such that the vehicle can readily collect sparsely located trees and skid such collected trees to a selected site.

---

This invention relates to an improved tree feller self-loading skidder vehicle for use in logging operations.

In a companion application filed concurrently herewith, there is disclosed a tree-felling vehicle which is also a self-loading skidder. The machine in question includes, in combination, a mobile vehicle, an extendible and retractable boom mounted on the vehicle, a felling head mounted on the boom and which includes a grapple adapted to engage a standing tree and means for severing the engaged tree, and a bunk mounted on the vehicle, such bunk including a plurality of means for selectively anchoring trees.

The vehicle in question is preferably an articulated vehicle which includes a pair of chassis pivotally interconnected for movement relative to one another about a substantially vertical axis. The boom is preferably a knuckle boom and the felling head is mounted with the open jaw facing in a direction away from the vehicle. The felling head assembly includes a grapple with a pair of jaws disposed in spaced relation for grasping a tree and with medium to small sized trees, the forces are such that the grapple can controllably manoeuver the tree after it has been severed from the stump, during slewing of the boom before lowering the tree to a horizontal position for placing the butt end thereof onto the bunk.

In accordance with the present invention, there is provided an improvement for handling larger trees which consists of a heeling device secured to the boom in spaced relation with respect to the felling head and wherein such heeling device faces in the same direction as the grapple jaw, i.e. it is located on the side of the boom remote from the vehicle. Heeling devices have been proposed as for example, in the vehicle illustrated in U.S. Pat. No. 3,227,295 issued Jan. 4, 1966, Canadian Pat. No. 689,502 issued June 30, 1964, U.S. Pat. No. 3,204,792 issued Sept. 7, 1965, and U.S. Pat. No. 3,165,215 issued Jan. 12, 1965.

In all of the aforementioned patents, the grapple is in depending relation with respect to the boom, that is, it is suspended from the boom and the heeling device is similarly located on the underside of the boom. Such an arrangement is operative and useful for picking up felled trees lying on the ground but it is obvious that the arrangement could not possibly be used to engage a vertical standing tree. Trees or logs in a vertical position present a different problem as exemplified by U.S. Pat. No. 3,112,-830 issued Dec. 3, 1963 where an auxiliary guide cable is employed during manoeuvering the log. In a machine of the present type, it is impractical to use a guy cable. Also in using the present machine, standing trees are severed which are located laterally to either side of the vehicle. In order to place the tree on the bunk, the boom is slewed about its vertical pivot axis while the tree is in a substantially vertical position whereafter the grapple is pivoted lowering the top end of the tree to the ground.

It is an object of the present invention to provide an improvement in a vehicle for handling trees, logs, or the like, to facilitate moving the same while in a generally vertical position, such improvement consisting of an abutment or heeling device secured to the extendible and retractable boom at a position vertically above the grapple means and on the same side of the boom as the grapple with the two being disposed remote from the vehicle to which the boom is attached.

The invention is illustrated by way of example in the accompanying drawings wherein:

FIG. 5 is a partial rear elevational view of the vehicle illustrated in FIGS. 1, 2 and 3;

FIG. 6 is a section along line 6—6 of FIG. 5;

Figure 1:
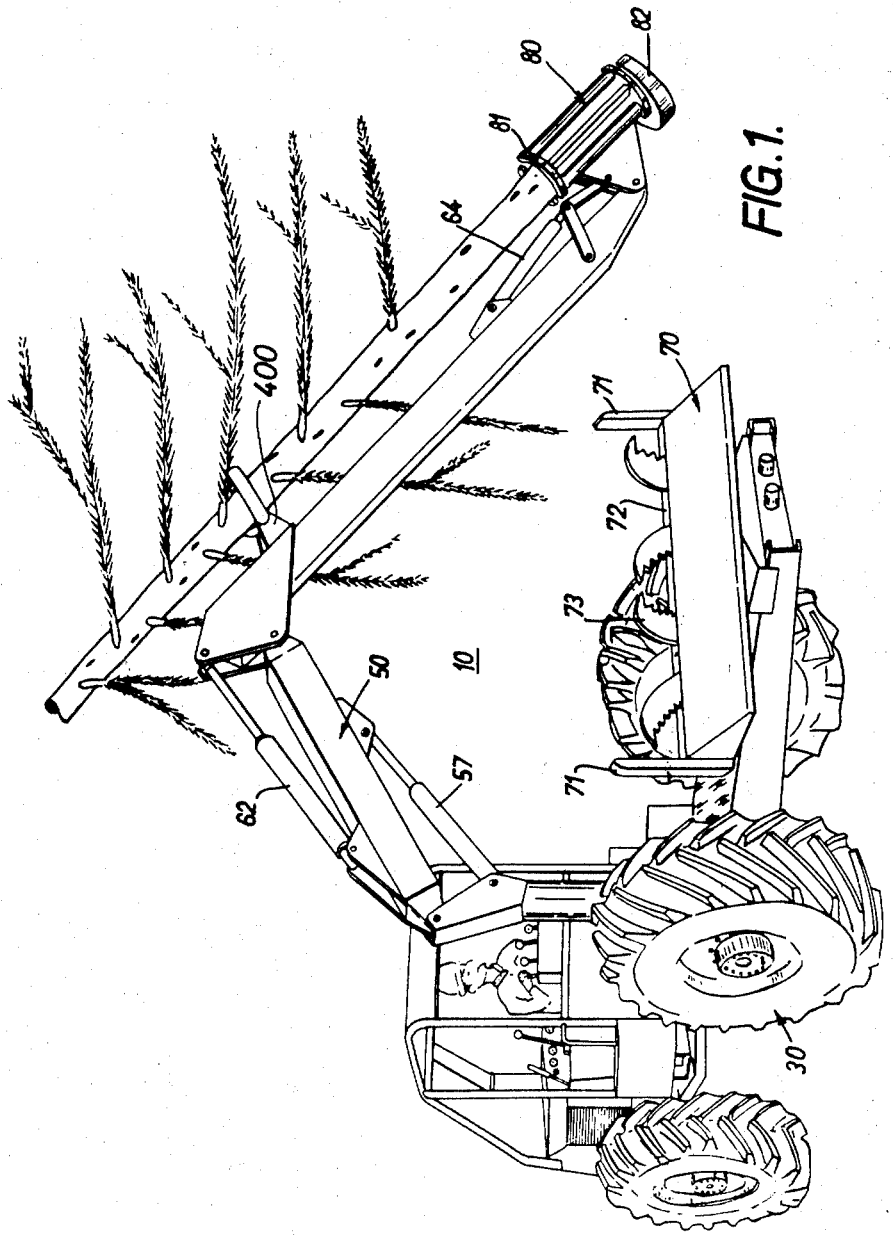
FIG. 1 is an oblique, diagrammatic illustration of a vehicle constructed in accordance with the present invention.

Referring now in detail to the drawings, shown in FIG. 1 is a tree feller-self-loading skidder vehicle 10 consisting of an articulated self-propelled vehicle 30 having a knuckle boom 50 and a tree bunk assembly 70, each, pivotally mounted thereon, the boom and bunk pivot axes being disposed in horizontal spaced relation with respect to one another. The articulated vehicle 30 includes a front frame assembly or chassis 31 and a rear frame assembly or chassis 32 pivotally interconnected by a pair of pins 33 and 34 whereby the frame assemblies are adapted to pivot with respect to one another about a substantially vertical axis 35. Each of the frame assemblies 31 and 32 is supported upon a pair of ground engaging wheels 36.

Figure 2:
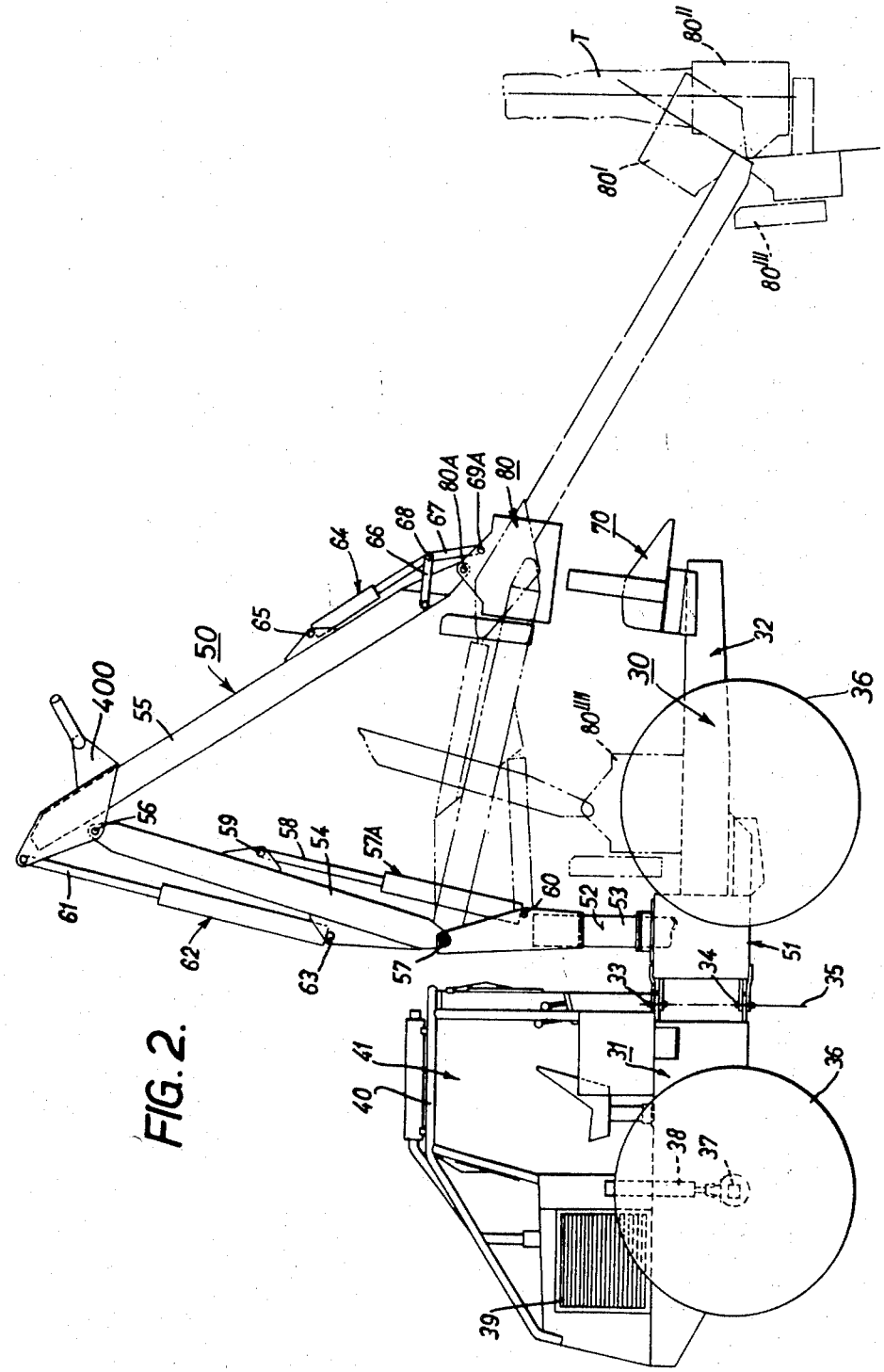
FIG. 2 is a side elevational view of the vehicle illustrated in FIG. 1.

As will be seen in FIG. 2, the pair of wheels 36 supporting the front chassis is connected to the frame by an axle 37 adapted to pivot about an axis parallel to the longitudinal axis of the vehicle. The pivotal connection of the axle 37 permits the front frame 31 to roll and control of such roll is effected by a pair of stabilizer cylinders 38. The frame 31 supports a motor 39 for use in driving the vehicle through the wheels 36.

A suitable transmission assembly for such drive is provided, but not shown in the drawings. The front frame 31 supports an open cab 40 surrounding the operator's control position 41 wherein suitable controls and seating for the operator are provided. The controls consist of levers for actuating valves in the hydraulic system to control operation of the various components as will be seen hereinafter, as well as other instruments and controls common to powered vehicles.

The wheels 36, supporting the rear frame 32, are secured rigidly thereto by a transversely disposed axle 38A. Mounted on the frame 32 adjacent the rear end thereof is a tree bunk assembly 70. The bunk assembly includes a pair of upstanding arms 71 located one at each end of the bunk and intermediate such arms is a relatively flat horizontal portion 72. A plurality of tongs or arms 73 are pivotally mounted on the bunk and are arranged selectively to engage trees on the bunk at horizontally spaced positions thereon, and thereby selectively anchor a plurality of trees to the vehicle for skidding purposes. The arms or tongs 73 are hydraulically controlled as will be seen hereinafter and because of this and further because of there being a plurality of arms, the vehicle is adapted to operate rapidly even in picking up sparsely located trees.

Figure 7:
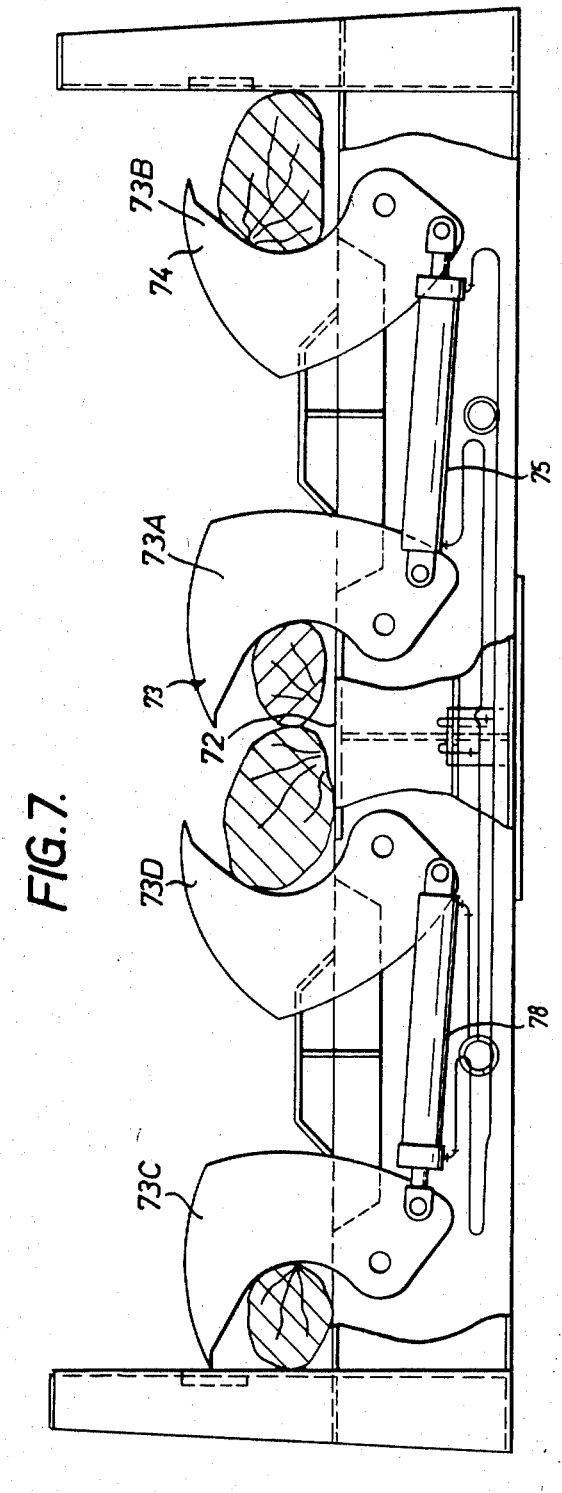
FIG. 7 is a partial sectional, rear elevational view of the bunk assembly pivotally mounted on the vehicle illustrated in FIG. 1.

The bunk assembly is more fully illustrated in FIG. 7 and includes a pair of arms 73A and 73B interconnected by a hydraulic cylinder 75 and a pair of arms 73C and 73D interconnected by a hydraulic cylinder 78. The hydraulic circuit of the pair of cylinders 75 and 78 is such that the movement of the arms 73A, B, C and D is interrelated as will be seen hereinafter with reference to the description of the hydraulic schematic in FIG. 8.

Figure 3:
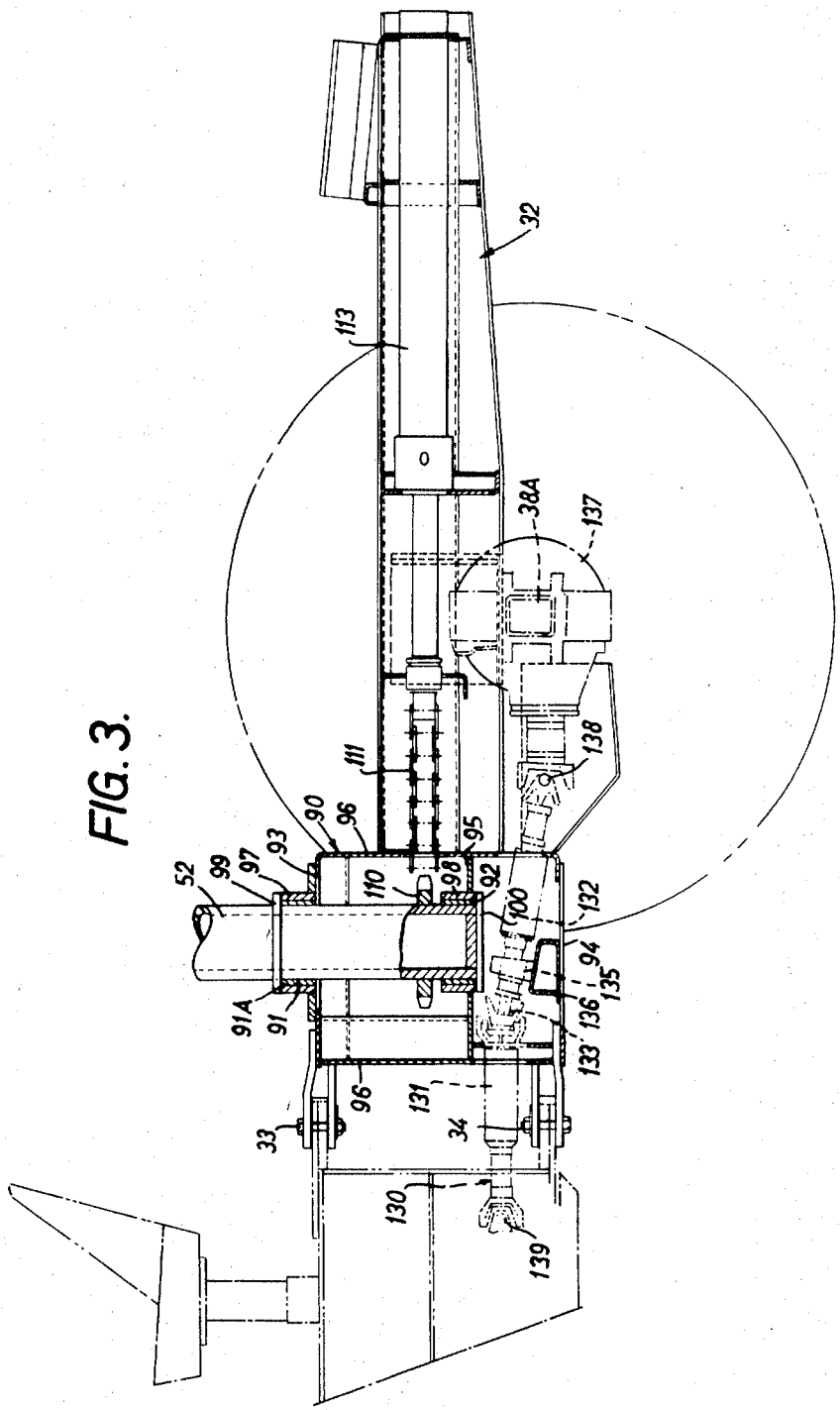
FIG. 3 is a vertical, partial cross-sectional view of a rear chassis constructed in accordance with one aspect of the present invention and for use in constructing an articulated vehicle, specifically for use with a boom and grapple assembly.

The boom 50 illustrated is a knuckle boom mounted on the frame 32 to pivot about a substantially vertical axis. The knuckle boom illustrated is a typical assembly which may be purchased from the John Deere Company and is known by the trade name "Rotoboom." The unit may be purchased for direct mounting on a vehicle and consists of a lower mount and pivotal assembly 51 with a post or mast 52 projecting upwardly therefrom and journalled for selective pivotal movement about a vertical axis 53. In the case of purchasing the John Deere unit, the lower mount and pivotal assembly 51 may be detachably secured to the chassis by bolts or it may be permanently secured by welding or some other suitable anchoring means. In the case of the John Deere assembly, mechanism for effecting oscillation of the mast about the vertical axis is enclosed within the mount and pivot assembly 51. As will be seen hereinafter, a further modified mount and actuating mechanism is illustrated in FIG. 3.

The boom further includes lever arms 54 and 55 pivotally interconnected by a pivot pin 56. The arm 54 is pivotally connected at the other end to the post 52 by a pivot pin 57. The lever arm 55 has a felling head assembly 80 pivotally secured thereto by a pin 80A at a position adjacent the free end thereof. The post 52 and lever 54 are interconnected by a hydraulic cylinder assembly 57A. The piston rod 58 of the hydraulic cylinder assembly 57 is pivotally secured to the lever arm 54 by a pivot pin 59 and the cylinder is pivotally secured to the post by a pivot pin 60. The pivot pins 59 and 60 are located in selected spaced relation with respect to the pivot pin 57. The lever 55 has a portion thereof projecting beyond the pivot pin 56 and pivotally secured to such extending portion is a piston rod 61 of a hydraulic cylinder assembly 62. The cylinder portion of the hydraulic cylinder assembly 62 is pivotally secured by a pin 63 to the lever 54. A further hydraulic cylinder assembly 64 is pivotally secured at one end by a pin 65 to the lever 55 and at the other end, to a scissor assembly consisting of levers 66 and 67 by a pin 68. The levers 66 and 67 are pivotally secured at their opposite ends respectively to the lever arm 55 of the boom by a pivot pin 69 and to the felling head assembly 80 by a pivot pin 69A.

The boom may be extended and retracted by appropriate fluid control in the hydraulic cylinder assemblies 57A and 62. The felling head assembly 80 may also be pivoted about the pin 80A which mounts the felling head on the boom lever arm 55 by appropriate control of fluid in the hydraulic cylinder assembly 64.

The maximum reach of the boom is dependent upon the length of the boom lever arms 54 and 55. In the boom illustrated in FIG. 2, it has a maximum reach of approximately 17 feet, 6 inches and the boom is illustrated in phantom in such position. At the maximum reach position, the felling head assembly is illustrated in three different positions. In the first position, the hydraulic cylinder assembly 64 is fully contracted and in such position the felling head assembly is tilted rearwardly as indicated at 80'. In a second position, the piston rod of the hydraulic cylinder assembly 64 is partially extended and the felling head assembly assumes a substantially vertical position as illustrated at 80". When the piston rod of the hydraulic cylinder assembly 64 is fully extended, the felling head assumes the third position wherein it is substantially horizontal as indicated at 80'''. In the first position, the degree of opening of the jaws of the grapple may be readily observed by the operator and this is the normal position the felling head assembly would assume prior to the operator placing the grapple jaws around a vertically standing tree. In the second position, the felling head assembly is brought into a position to embrace a vertically disposed tree. After severing the tree, the felling head assembly may be pivoted to the third position where the tree is felled to the ground while remaining engaged by the grapple and thereafter the butt end lifted by the boom and grapple assembly onto the bunk 70.

The boom position is illustrated in solid line in FIG. 2 with the felling head assembly 80 in approximately the position it would assume in loading the tree onto the bunk. At the position illustrated, the grapple jaws of the feller head assembly may be opened and the butt end of the tree dropped by gravity vertically onto the bunk assembly 70 or alternatively placed gently thereon. A fourth position 80'''' is illustrated wherein the felling head assembly is supported on the vehicle carriage or frame 32. This fourth position is a position wherein the felling head assembly may be carried by the vehicle while the vehicle is being moved from one location to another.

The boom is illustrated in FIG. 5 reaching laterally or to one side of the vehicle. The boom is illustrated in the extended position in solid line and in phantom in a partially retracted position. There is a modification illustrated in FIG. 5 in that the hydraulic cylinder assembly 64 for effecting tilting of the felling head assembly is pivotally connected directly to the felling head rather than indirectly through a scissor arrangement as in the other embodiment. There is also a further modification and that is the provision of a supplemental mounting bracket 300 (see also FIG. 9) detachably secured to the free end of the boom intermediate the felling head and the boom. The felling head is pivotally mounted on the bracket 300 by a pin 301.

Secured to the boom section 55 in the proximity of the pivot pin 56 is a heeling device or abutment means 400 which, in FIG. 5, is illustrated on the boom drawn in phantom as it may be an alternative to the construction. As previously mentioned, the felling head consists of a grapple assembly having a pair of spaced jaws gripping the tree respectively, at a pair of spaced positions. A tree accordingly may be handled by the grapple for lifting and tilting controllably the tree up to a certain size. On large trees, however, the abutment or heeling device 400 may be used to engage the tree at a position spaced from the grapple. The tree thus supported may be readily maneuvered by the boom and grapple assembly. The heeling device or abutment means 400 consists of a bracket 401 rigidly secured as by welding or other means to the boom portion or leg 55 and a U-shaped cradle member 404 secured thereto. In FIG. 6, the bracket is illustrated as consisting of a pair of arms 402 and 403 anchored at one end to the boom section 55 as by welding. The U-shaped cradle portion 404 is anchored as by welding or some other means to the opposite end of the bracket members 402 and 403. The open portion of the U-shaped cradle is directed outwardly from the boom such that trees may be tilted by the grapple towards the boom and the tree thus tilted, nests between the upstanding or outwardly directly arms.

As previously mentioned, the vertical post or mast 52 of the boom is pivotally mounted on the rear carriage or frame 32 of the articulated vehicle. In referring to FIG. 3 of the drawings, there is illustrated a modified carriage including means for pivotally mounting the post. The post 52 is journalled in a box assembly 90 by a pair of vertically spaced journals 91 and 92. The box 90 includes an upper reinforced top wall 93, a lower wall 94 and an intermediate reinforced wall 95, all disposed in generally horizontal relation and interconnected at opposite edges by a pair of vertically disposed horizontally spaced walls 96. The journal 91 consists of a bronze shell inserted into a sleeve 97 secured to the top wall 93. The lower bearing 92 similarly consists of a bronze shell inserted into a sleeve 98 secured to the intermediate wall 95. A flange 99 is secured to and projects outwardly from the post 52 to overlap and bear against an end flange portion 91A of the bearing sleeve of journal 91. The collar or flange 99 thus provides a vertical support for the boom post or mast 52. The lower end of the mast 52 is covered by a cap 100 secured thereto and which bears against the lowermost edge of the journal 92 and the sleeve 98. The cap 100 thus prevents the post 52 from being vertically lifted or displaced from the sleeves 91 and 92.

Figure 4:
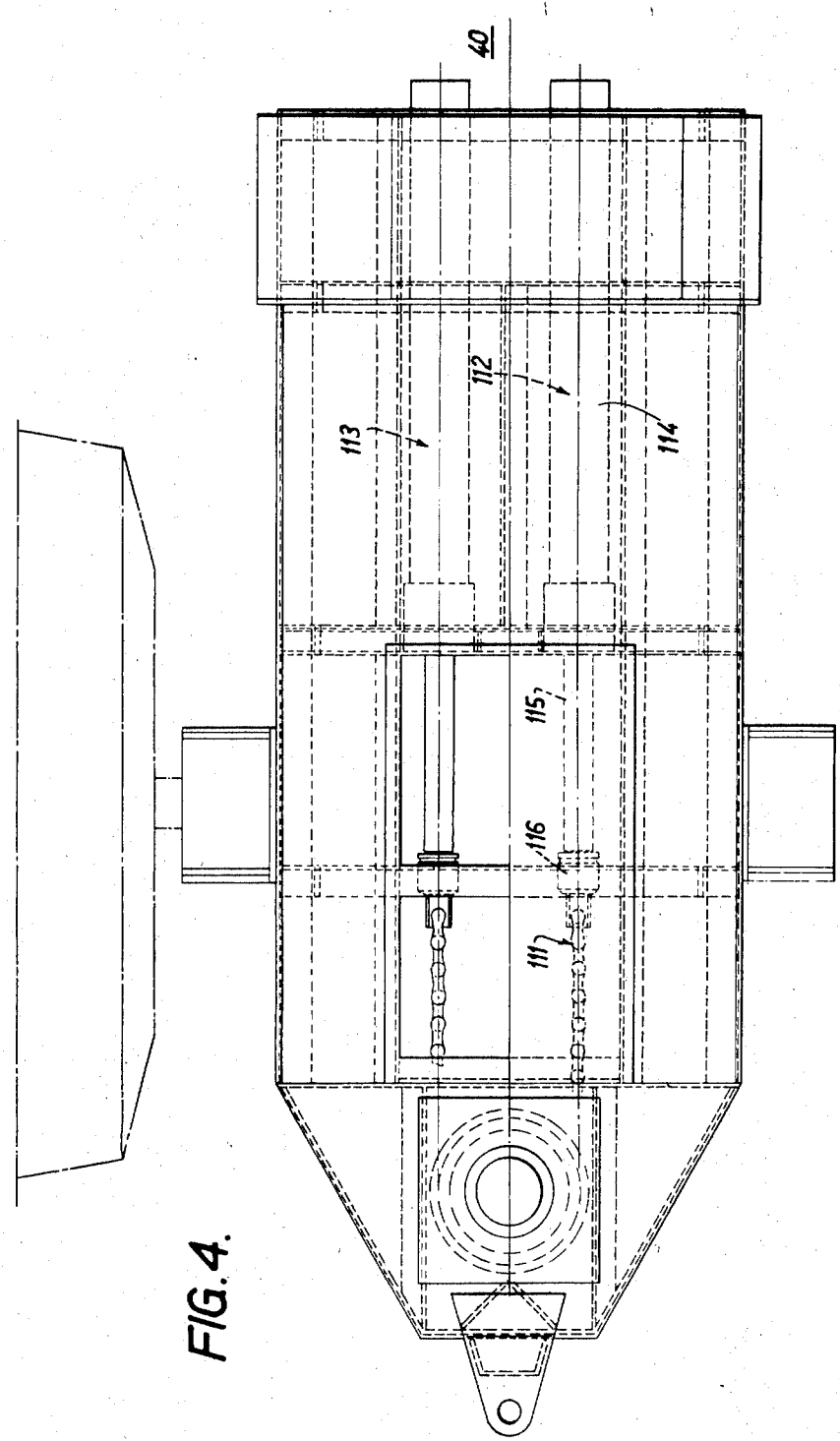
FIG. 4 is a partial top plan view of the chassis illustrated in FIG. 3 with the mast removed.

A sprocket 110 is secured to the mast or post 52 intermediate the journals 91 and 92. Slewing of the boom about the axis of the post 52 is effected by a link chain 111 anchored at opposite ends respectively to hydraulic cylinders 112 and 113 (see FIG. 4). The link chain entrains the sprocket 110 and extension and retraction of the hydraulic cylinder assemblies 112 and 113 accordingly, effects oscillation of the post about its vertical axis. Each of the hydraulic cylinder assemblies 112 and 113 includes a cylinder portion 114 secured to the frame 32 and a piston rod 115. The link chain 111 is anchored to the free end of the piston rods 115 by a suitable coupling member 116. In an alternative arrangement, the sprocket 110 may be replaced by a gear adapted to mesh with a rack (not shown) which replaces the link chain 111. The rack may be suitably connected to a hydraulic cylinder for oscillation along a selected path and thereby effect pivotal movement of the post by engagement of the rack with the teeth of the gear. In either embodiment, the hydraulic cylinder may be substantially parallel to the upper flat horizontal surface of the frame assembly 32. Such arrangement permits a relatively shallow frame.

The wheels 36 of the rear frame 32 may be driven through a drive shaft 130 connected at its forward end to a transmission (not shown) driven by the motor 39. The other end of the drive shaft 130 may be connected to a pinion meshing with a crown gear as in a normal drive for a vehicle. The drive shaft 130 consists of stub shafts 131 and 132 interconnected by a universal joint 133. The stub shaft 132 is supported by a bearing 135 mounted on a bracket 136 on the lower wall 94 of the box 90. The shaft 132 is connected to the differential or pinion and crown gear as the case may be, enclosed in the housing 137 by a further universal joint 138. The drive shaft portion 131 may be connected by a further universal joint 139 to a transmission driven by the motor 39. The wheels 36, secured to the front frame portion 31, also may be connected to the same transmission through a suitable drive shaft (not shown).

Figure 9:
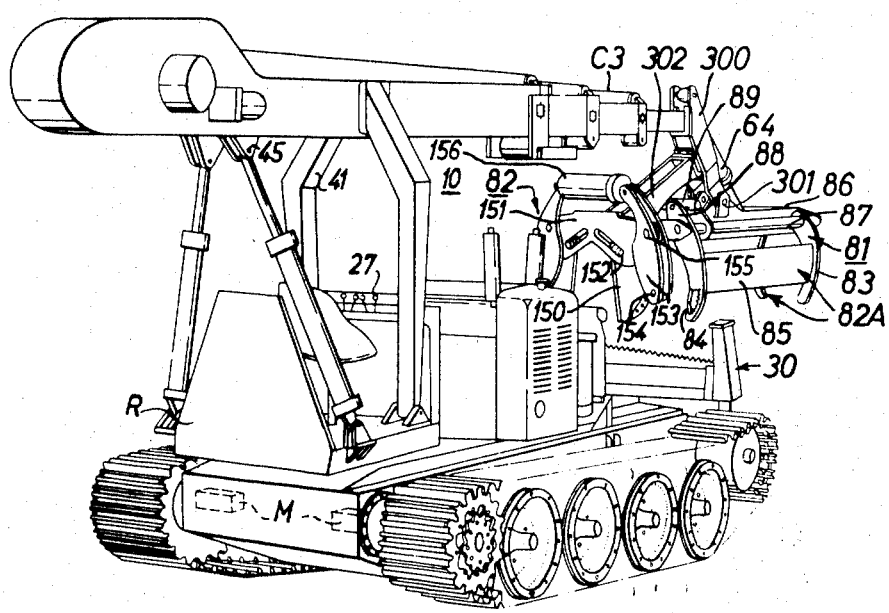
FIG. 9 is an oblique view of a modified log feller-skidder vehicle wherein the tractor portion is a track vehicle.

The felling head mechanism 80 consists of a grapple 81 and a shear 82, each of which are operated by hydraulic cylinders. Referring to FIG. 9, the grapple 81 consists of a pair of relatively movable jaws 82A, each of which consists of a pair of spaced arms 83 and 84 rigidly interconnected by a plate 85 and hingedly mounted on a frame 86 by a pin 87. The frame 86 is pivotally connected to the boom by the pin 80A. The arms 84 of each jaw have a rearwardly extending portion 88 and such extending portion of the two arms 84 is pivotally interconnected by a hydraulic cylinder 89.

The shear mechanism 82 is preferably detachably secured to the frame 86 and is disposed at a position in spaced realtionship with respect to the grapple 81. The shear consists of a pair of relatively movable blades 150, each mounted on a frame 151 by a sliding pivot 152 and a lever 153. The lever 153 is pivotally secured to the respective blades by a pin 154 and to the frame 151, by a pin 155. The levers 153 include a rearwardly extending portion to which there is pivotally attached a hydraulic cylinder assembly 156. From a description to follow of the hydraulic circuitry, it will be seen that the hydraulic cylinders 89 and 156 effect operation respectively of the grapple jaws and the shear blades.

Figure 8:
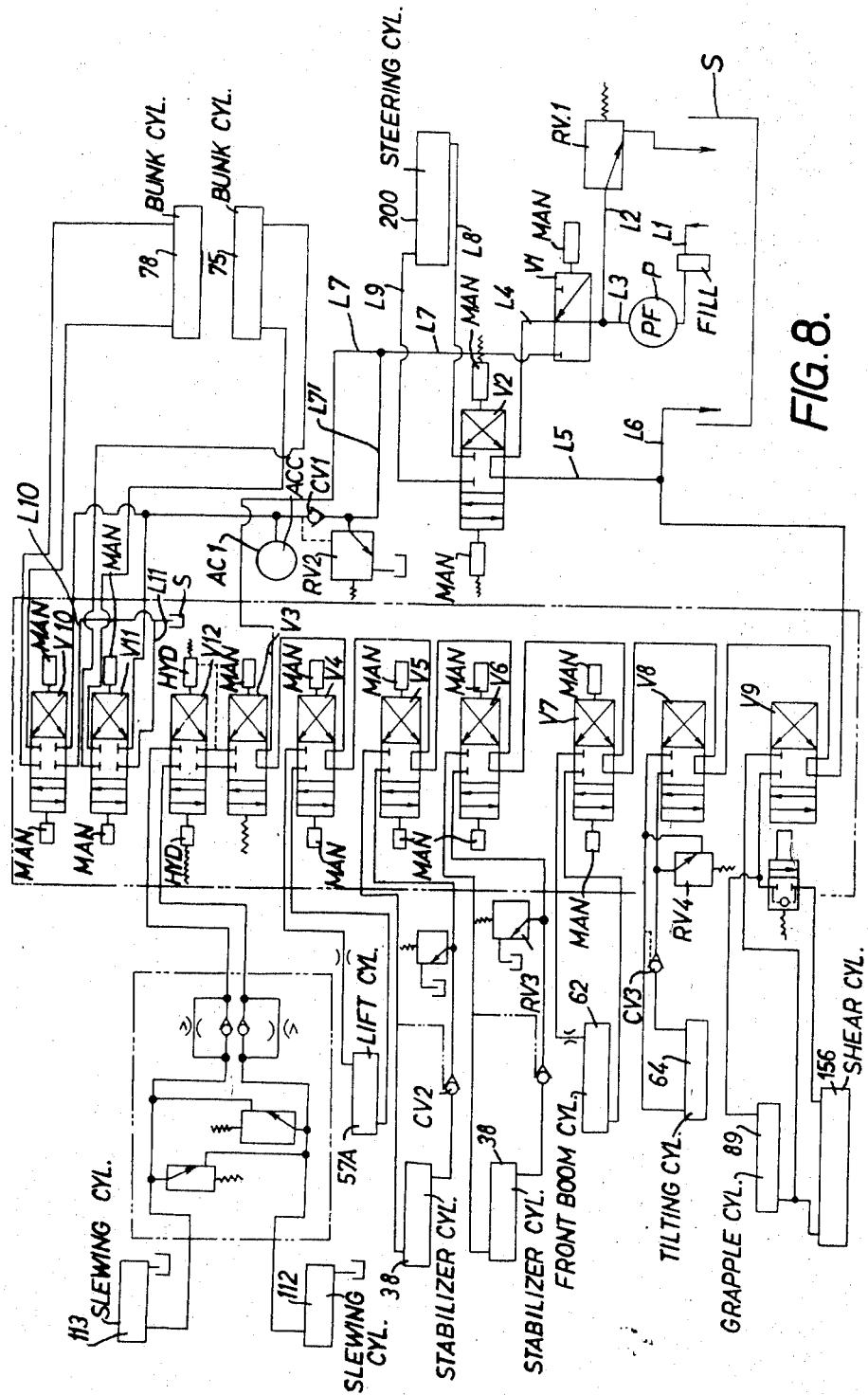
FIG. 8 is a schematic of the hydraulic system of the vehicle illustrated in FIG. 1.

Referring now to FIG. 8, which is a schematic of the hydraulic system, there is an oil sump S from which a pump P draws oil through a line L1. The output from the pump may return to the sump by way of a line L2 through a pressure relief valve RV1 or alternatively, to a manually controlled valve V1 through a line L3. A line L4 connects the valve V1 to a further manually controlled valve V2 and continues on through the valve to provide a return to the sump S through lines L5 and L6. A further line L7 connects valve V1 and the valves V3 to V9 inclusive and returns to the sump through the line L6. The valve V2 is a two-position, manually controlled valve for controlling fluid to a double acting steering cylinder 200 through lines L8 and L9. Fluid under pressure from the pump P is supplied to manually control valves V10 and V11 through a line L7' branching from the line L7 intermediate the valves V1 and V3. A pressure relief valve RV2 is connected to the line L7' as is also an accumulator AC1. Intermediate the relief valve RV2 and accumulator AC1 is a check valve CV1. The valves V10 and V11 control respectively, bunk cylinders 75 and 78 and fluid returns to the sump S through respective lines L10 and L11. The valve V3 is a manual valve controlling actuation of a hydraulic valve V12 which, through a flow control and check valve, controls actuation of the slewing cylinders 112 and 113. The valve V4 is a manually operated valve used to control operation of the boom lift cylinder 57A. Valve V5 is a manually controlled valve as is also valve V6 which controls operation of respective ones of the pair of stabilizer cylinders 38. A check valve CV2 is located in each of the lines to the cylinder as is also a pressure relief valve RV3 returning to the sump S. The valve V7 is a manually operated valve used to control operation of the front boom cylinder 62 and the valve V8 controls operation of the felling head tilt cylinder 64. A check valve CV3 is located in the line from the cylinder 64 as is also a pressure relief valve RV4. The valve V9 is a solenoid actuated valve providing selective control of operation of the grapple cylinder 89 and the shear cylinder 156.

In the foregoing, there is disclosed an articulated vehicle equipped for use in felling and skidding trees. A modified vehicle is illustrated in FIG. 9 wherein the tractor portion is a track vehicle as disclosed in the aforementioned U.S. Pat. No. 3,277,295. The vehicle is hydraulically operated, the tracks being driven by individual hydraulic motors M, thereby providing means for steering the vehicle. A telescopic boom assembly 40A is mounted on a frame R adapted to pivot on the vehicle thereby providing slewing of the boom assembly. Secured to the free end of the innermost box section of the telescopic boom is the previously described felling head assembly 80 consisting of a grapple 81 and a shear 82 mounted on a common frame adapted to pivot with respect to the boom about a pin 301. In the embodiment illustrated in this figure, the felling head mounting bracket 301 has an abutment 302 projecting downwardly therefrom to engage the shear mechanism. The abutment strikes the shear frame 151 and thereby limits the horizontal disposition of the felling head providing a rest position for the latter during movement of the vehicle.

A hydraulic cylinder is provided for controlling the grapple and a further hydraulic cylinder is provided for effecting actuation of the shear blades and a still further hydraulic cylinder is provided for tilting the felling head assembly relative to the boom. In each of the two embodiments, the felling head is mounted such that it may grasp vertical standing trees, or alternatively, grasp trees which have previously been felled and are lying on the ground.

In the foregoing description and in the accompanying drawings, the boom is mounted on the rear chassis of the vehicle. In an alternative embodiment, the boom assembly may be mounted by means of a suitable rotary mount on the roof or the cab of the vehicle. Such mounting places the entire boom assembly at a position vertically above the operator and also has the effect of placing the boom on the other chassis, that is, the one which does not have the bunk assembly mounted thereon.

I claim:
1. A log-handling vehicle comprising in combination:
 (a) a self-propelled vehicle;
 (b) an extendible and retractable boom mounted on said vehicle;
 (c) a grapple pivotally attached to said boom and having a jaw with the opening thereof facing in a direction away from the vehicle and being adapted for selectively engaging and tightly grasping a tree or the like;
 (d) power means connected to said grapple for pivoting the same about its pivotal connection to the boom; and
 (e) a heeling device secured to said boom at a position intermediate the pivotal connection of the grapple to the boom and the vehicle, said heeling device facing in a direction away from the vehicle for abutting against a tree grasped by the grapple and located on the side of the boom remote from the vehicle, said heeling device engaging such tree at a position spaced vertically above the grapple.

2. A log-handling vehicle as defined in claim 1 wherein said boom is a knuckle boom.

3. A log-handling vehicle as defined in claim 1 wherein said grapple and heeling device are located on a common boom element.

4. A log-handling vehicle as defined in claim 3, including a cutting device mounted on said common boom element and located at a position spaced vertically below said grapple.

5. A log-handling vehicle as defined in claim 4 wherein said cutting device comprises a shear.

6. A log-handling vehicle as defined in claim 5 wherein said shear and grapple are mounted on a common frame pivotally attached to said boom.

7. A log-handling vehicle as defined in claim 6 wherein said extendible and retractable boom is mounted on said vehicle for slewing about a substantially vertical axis.

8. A tree-handling vehicle as defined in claim 3 wherein said heeling device is U-shaped with the open mouth thereof facing in a direction away from the vehicle.

9. A log-handling vehicle as defined in claim 1 including a tree severing mechanism secured to said boom and disposed for severing a vertically standing tree engaged by the grapple at a position vertically below the grapple.

10. A log-handling vehicle as defined in claim 1 including a bunk mounted on said vehicle and having log engaging means associated therewith for anchoring trees thereto.

11. A tree-handling vehicle as defined in claim 1 wherein said heeling device projects laterally beyond the boom member to which it is secured.

12. A tree-handling vehicle as defined in claim 1 wherein said heeling device is U-shaped with the open mouth thereof facing in a direction away from the vehicle.

13. A tree-handling vehicle as defined in claim 1 wherein said boom is a knuckle boom and the heeling device is attached to the same boom element as the grapple, said heeling device being generally U-shaped with the open mouth thereof facing away from said vehicle and located adjacent the pivotal connection of the aforementioned boom element to an adjacent boom element.

14. A vehicle adapted to sever a standing tree, load the severed tree onto the vehicle and skid such tree along with further previously similarly loaded trees to a selected site and, thereafter unload the trees from the vehicle comprising in combination, an articulated wheeled vehicle having a first and second chassis pivotally interconnected for articulated movement relative to one another about a substantially vertical first axis, each of said chassis being mounted upon at least a pair of wheels and at least one of said chassis or axle, joining the pair of wheels associated therewith, being mounted to pivot about a second longitudinal axis, a prime mover mounted on at least one of said chassis, an operator's control station mounted on at least one of said chassis, an operator's control station mounted on the same said chassis and including control means for effecting operation of the various components of the vehicle, an extendible and retractable boom mounted on said vehicle for slewing about a substantially vertical axis, a felling head including a grapple and cutting means pivotally secured to said boom adjacent the free end thereof, and a heeling device secured to said boom at a position disposed in spaced relation with respect to the pivotal connection of said felling head to said boom and located on the side of the boom remote from said vehicle for engaging a severed tree supported by the felling head.

15. A machine as defined in claim 14 wherein said boom is a knuckle boom.

16. A felling, self-loading and self-unloading carrier for trees comprising, in combination:
 (a) a vehicle including a first chassis and a second chassis, means joining the two chassis together for articulated movement relative to one another about a first substantially vertical axis, means permitting roll for said vehicle about a second horizontal axis generally parallel to the length of said vehicle, a prime mover on a selected one of said chassis, an operator's station including controls for operating operating said vehicle disposed on a selected one of said chassis;
 (b) tree handling and cutting means including a boom, said boom being mounted on a selected one of said chassis for slewing about a substantially vertical axis, a felling head including a tree engaging and cutting means pivotally attached to said boom adjacent the free end thereof, and a heeling device comprising an abutment secured to the boom at a position in spaced relation with respect to the pivotal connection of the felling head to the boom and facing away from the vehicle for stabilizing a tree at a convenient point during the felling operation with such tree located on the side of the boom remote from the vehicle, means associated with said boom and said tree engaging and cutting means to position said tree engaging and cutting means on the base of a tree situated in a growing position within the reach of said felling head; and
 (c) a load carrying means mounted on a selected one of said chassis to receive the butt ends of trees and to anchor said butt ends to said chassis, said receiving and securing means being located within the reach of said tree engaging means.

17. A vehicle as defined in claim 16 wherein said felling head and said heeling device are mounted on the same boom element.

18. A vehicle as defined in claim 17 wherein said load carrying and receiving means comprises a bunk pivotally mounted on the trailing chassis of the vehicle for movement about a substantially vertical axis, wherein said boom is pivotally mounted on the same chassis and wherein the prime mover and operator's station are mounted on the other of said chassis.

19. A mobile vehicle for use in felling and skidding trees comprising in combination:
(a) a mobile self-propelled vehicle;
(b) an extendible and retractable boom mounted on said vehicle;
(c) a felling head pivotally attached to said boom, said felling head comprising,
   (i) a grapple including a frame, a jaw defined by a pair of members secured to said frame and at least one of which is movable relative to the other, and
   (ii) a cutting device rigidly secured to said frame in selected fixed spaced relation with respect to said grapple, said cutting device including a pair of cutting members at least one of which is movable relative to the other and defining a shear jaw, the grapple and shear jaws being commonly oriented for receiving and embracing an elongated article;
(d) a heeling device secured to said boom at a position intermediate the pivotal connection of the felling head to the boom and the vehicle, said heeling device being located adjacent the side of the boom remote from the vehicle and facing away from the vehicle for abutting against a tree grasped by the grapple and at a position spaced vertically above the latter; and
(e) a bunk mounted on said vehicle, said bunk including means for anchoring trees thereto whereby said vehicle is adapted to skid trees by grasping the same adjacent one end thereof.

References Cited

UNITED STATES PATENTS

| | | | |
|---|---|---|---|
| 3,102,563 | 9/1963 | Horncastle | 144—3 |
| 2,656,059 | 10/1953 | Troyer | 214—147 |
| 2,990,630 | 7/1961 | Crawford | 214—3 |
| 3,049,186 | 8/1962 | Garrett | 180—51 |
| 3,074,447 | 1/1963 | Bombardier | 144—3 |
| 3,112,037 | 11/1963 | Thiermann | 214—3 |
| 3,159,229 | 12/1964 | Thwaites | 180—51 |
| 3,189,117 | 6/1965 | Ammon | 180—51 |
| 3,289,865 | 12/1966 | Hamilton et al. | 214—147 |
| 3,348,592 | 10/1967 | Winblad et al. | 144—309 |
| 3,356,116 | 12/1967 | Brundell et al. | 144—309 |
| 3,116,048 | 12/1963 | Irwin et al. | 144—34 |

GERALD A. DOST, Primary Examiner

U.S. Cl. X.R.

144—34; 214—3, 147

UNITED STATES PATENT OFFICE
CERTIFICATE OF CORRECTION

Patent No. 3,527,271                           September 8, 1970

Jean Y. Chateauneuf

It is certified that error appears in the above identified patent and that said Letters Patent are hereby corrected as shown below:

In the heading to the printed specification, lines 7 and 8, "Anne Paper Ltd." should read -- Abitibi St. Anne Paper Ltd. --.

Signed and sealed this 16th day of March 1971.

(SEAL)
Attest:

Edward M. Fletcher, Jr.                      WILLIAM E. SCHUYLER, JR.
Attesting Officer                             Commissioner of Patents